United States Patent
Vu et al.

(10) Patent No.: US 9,063,246 B2
(45) Date of Patent: Jun. 23, 2015

(54) EXPLOITATION OF SELF-CONSISTENCY AND DIFFERENCES BETWEEN VOLUME IMAGES AND INTERPRETED SPATIAL/VOLUMETRIC CONTEXT

(75) Inventors: Cung Khac Vu, Houston, TX (US); Henry W. Posamentier, The Woodlands, TX (US); James P. DiSiena, Houston, TX (US); Todd Dygert, Kingwood, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 948 days.

(21) Appl. No.: 13/018,108

(22) Filed: Jan. 31, 2011

(65) Prior Publication Data
US 2012/0197614 A1    Aug. 2, 2012

(51) Int. Cl.
G06G 7/48 (2006.01)
G01V 1/30 (2006.01)

(52) U.S. Cl.
CPC ........................ *G01V 1/30* (2013.01)

(58) Field of Classification Search
None
See application file for complete search history.

(56) References Cited

U.S. PATENT DOCUMENTS

| | | | |
|---|---|---|---|
| 5,838,634 A | 11/1998 | Jones et al. | |
| 6,138,075 A | 10/2000 | Yost | |
| 6,757,217 B2 | 6/2004 | Eastwood et al. | |
| 6,823,266 B2 | 11/2004 | Czernuszenko et al. | |
| 7,328,107 B2 | 2/2008 | Strack et al. | |
| 7,480,206 B2 * | 1/2009 | Hill | 367/73 |
| 7,925,481 B2 * | 4/2011 | Van Wagoner et al. | 703/10 |
| 2002/0120429 A1 | 8/2002 | Ortoleva | 703/2 |
| 2003/0110018 A1 | 6/2003 | Dutta et al. | |
| 2009/0204377 A1 | 8/2009 | Van Wagoner et al. | 703/9 |
| 2010/0177595 A1 | 7/2010 | Khare et al. | |
| 2010/0186950 A1 | 7/2010 | Neelamani et al. | |

OTHER PUBLICATIONS

International Search Report and Written Opinion for PCT/US2012/022971 mailed Sep. 28, 2012.
Stack—Definition and More from the Free Merriam-Webster Dictionary, p. 1, printed on Sep. 12, 2013.
Roden, Rocky, et al.; "The Impact of Seismic Amplitudes on Prospect Risk Analysis"; Business Briefing, Exploration & Production, The Oil & Gas Review, 2005, Issue 2, pp. 1-7.
Final Office Action, mailed on Nov. 20, 2014, during the prosecution of co-pending U.S. Appl. No. 13/017,995.
Notice of Allowance and Fee(s) Due, issued on Dec. 5, 2014, during the prosecution of co-pending U.S. Appl. No. 13/017,995.
International Search Report, issued on Sep. 28, 2012, during the prosecution of International Patent Application No. PCT/US2012/022903.
Written Opinion of the International Searching Authority, issued on Sep. 28, 2012, during the prosecution of International Patent Application No. PCT/US2012/022903.

* cited by examiner

*Primary Examiner* — Saif Alhija
(74) *Attorney, Agent, or Firm* — Albert K. Shung

(57) ABSTRACT

Self-consistency and/or differences between volume images and interpreted spatial/volumetric context may be exploited for improving seismic imaging and estimation of attributes of geobodies, in accordance with one or more embodiments. Exemplary embodiments allow exploitation of positional and/or shape discrepancies and/or similarities of geobodies in image volumes associated with a geologic model of a geologic volume of interest to improve the accuracy of the geologic model and/or the image volumes. Constraints associated with the geologic volume of interest may be determined and/or utilized to confirm and/or specify dependencies between attributes that are potentially associated with individual geobodies.

18 Claims, 2 Drawing Sheets

EXPLOITATION OF SELF-CONSISTENCY AND DIFFERENCES BETWEEN VOLUME IMAGES AND INTERPRETED SPATIAL/VOLUMETRIC CONTEXT

FIELD OF THE DISCLOSURE

This disclosure relates to improving seismic imaging and estimation of attributes and/or rock properties of geobodies by exploiting self-consistency and/or differences between volume images and interpreted spatial/volumetric context.

BACKGROUND OF THE DISCLOSURE

Seismic imaging and subsurface interpretation are performed to obtain, as accurately as possible, a geologic model of a subsurface volume of the earth. Conventional industry workflows generally include the following serial process steps: (a) process the seismic data into 3D seismic image volumes of the subsurface volume of the earth; (b) extract attributes (e.g., velocity, Poisson's ratio, density, acoustic impedance, etc.) at each subsurface point in the subsurface volume of the earth using tabulated and other known petrophysical data and rock properties; (c) interpret the geometry of the 3D seismic image volumes, log information, and geological analogs on an interpretation workstation to obtain the structure, stratigraphic, and geologic morphology; and (d) construct a geological and reservoir subsurface model from extracted attributes and the obtained structure, stratigraphic, and geologic morphology.

Conventional industry workflows have limited reconciliation/integration of earth models used in imaging with interpretation of structure and stratigraphy, and with reservoir properties from seismic estimation. Each process step has inherent uncertainties and non-uniqueness that cannot be well defined quantitatively. Consequently, it is difficult to quantify the uncertainties and non-uniqueness of geological reservoir models yielded by conventional industry workflows. Most industry workflows resort to geostatistical methods to estimate uncertainties and non-uniqueness. Even so, there is no guarantee that the resulting, probabilistic models are consistent with all the data utilized in generating the models.

SUMMARY

One aspect of the disclosure relates to a computer-implemented method for constraining a range of rock properties and confirming and/or specifying dependencies between rock properties of geobodies associated with a geologic volume of interest. The method may include identifying geobody representations that represent geobodies in the geologic volume of interest. The geobody representations may be interpreted from individual ones of a plurality of multi-offset-multi-attribute image volumes. A given one of the multi-offset-multi-attribute image volumes may (1) correspond to one of the offset stacks, angle stacks, or azimuth stacks, (2) be associated with one of the attributes, and (3) include geobody representations of geobodies present in the geologic volume of interest. The method may include receiving assignments of geobody types corresponding to the identified geobody representations based on geologic principles, stratigraphic principles, and/or an analog database. The method may include determining one or more property constraints for one or more rock properties of the geobodies in an earth model and/or a velocity model associated with the geologic volume of interest by constraining a range of rock properties associated with individual ones of the geobodies based on geologic principles, stratigraphic principles, and/or an analog database. The method may include verifying the one or more property constraints based on one or more of dependencies between the one or more rock properties, well data logs, data derived from well data logs, or local geological knowledge of the geological volume of interest.

Another aspect of the disclosure relates to a system configured to constrain a range of rock properties and confirming and/or specifying dependencies between rock properties of geobodies associated with a geologic volume of interest. The system may include one or more processors configured to execute computer program modules. The computer program modules may include a geobody interpretation module, a property constraints module, and/or other modules. The geobody interpretation module may be configured to identify geobody representations that represent geobodies in the geologic volume of interest. The geobody representations may be interpreted from individual ones of a plurality of multi-offset-multi-attribute image volumes. A given one of the multi-offset-multi-attribute image volumes may (1) correspond to one of the offset stacks, angle stacks, or azimuth stacks, (2) be associated with one of the attributes, and (3) include geobody representations of geobodies present in the geologic volume of interest. The geobody interpretation module may be further configured to receive assignments of geobody types corresponding to the identified geobody representations based on geologic principles, stratigraphic principles, and/or an analog database. The property constraints module may be configured to determine one or more property constraints for one or more rock properties of the geobodies in an earth model and/or a velocity model associated with the geologic volume of interest by constraining a range of rock properties associated with individual ones of the geobodies based on geologic principles, stratigraphic principles, and/or an analog database. The property constraints module may be further configured to verify the one or more property constraints based on one or more of dependencies between the one or more rock properties, well data logs, data derived from well data logs, or local geological knowledge of the geological volume of interest.

Yet another aspect of the disclosure relates to a computer-readable storage medium having instructions embodied thereon. The instructions may be executable by a processor to perform a method for constraining a range of rock properties and confirming and/or specifying dependencies between rock properties of geobodies associated with a geologic volume of interest. The method may include identifying geobody representations that represent geobodies in the geologic volume of interest. The geobody representations may be interpreted from individual ones of a plurality of multi-offset-multi-attribute image volumes. A given one of the multi-offset-multi-attribute image volumes may (1) correspond to one of the offset stacks, angle stacks, or azimuth stacks, (2) be associated with one of the attributes, and (3) include geobody representations of geobodies present in the geologic volume of interest. The method may include receiving assignments of geobody types corresponding to the identified geobody representations based on geologic principles, stratigraphic principles, and/or an analog database. The method may include determining one or more property constraints for one or more rock properties of the geobodies in an earth model and/or a velocity model associated with the geologic volume of interest by constraining a range of rock properties associated with individual ones of the geobodies based on geologic principles, stratigraphic principles, and/or an analog database. The method may include verifying the one or more property constraints based on one or more of dependencies between the one or more rock properties, well data logs, data derived from well data logs, or local geological knowledge of the geological volume of interest.

These and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the technology. As used in the specification and in the claims, the singular form of "a", "an", and "the" include plural referents unless the context clearly dictates otherwise.

DETAILED DESCRIPTION

Figure 1:
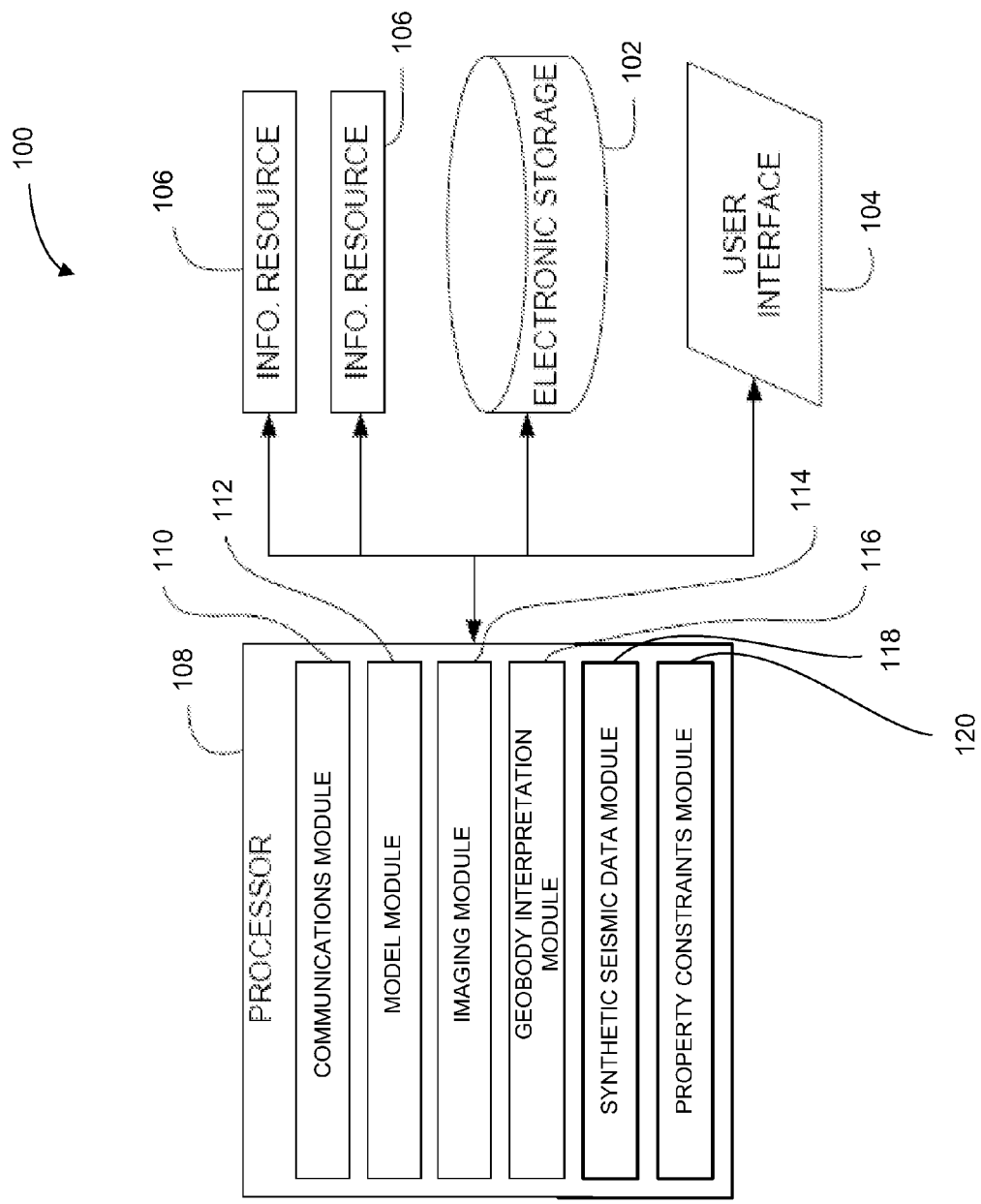
FIG. 1 illustrates a system configured to improve seismic imaging and estimation of attributes and/or rock properties of geobodies by exploiting self-consistency and/or differences between volume images and interpreted spatial/volumetric context, in accordance with one or more embodiments.

The present technology may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present technology may be coded in different languages for application in a variety of computing platforms and environments. It will be appreciated that the scope and underlying principles of the present technology are not limited to any particular computer software technology.

Moreover, those skilled in the art will appreciate that the present technology may be practiced using any one or combination of hardware and software configurations, including but not limited to a system having single and/or multi-processer computer processors system, hand-held devices, programmable consumer electronics, mini-computers, mainframe computers, and the like. The technology may also be practiced in distributed computing environments where tasks are performed by servers or other processing devices that are linked through one or more data communications networks. In a distributed computing environment, program modules may be located in both local and remote computer storage media including memory storage devices.

Also, an article of manufacture for use with a computer processor, such as a CD, pre-recorded disk or other equivalent devices, may include a computer program storage medium and program means recorded thereon for directing the computer processor to facilitate the implementation and practice of the present technology. Such devices and articles of manufacture also fall within the spirit and scope of the present technology.

Referring now to the drawings, embodiments of the present technology will be described. The technology can be implemented in numerous ways, including for example as a system (including a computer processing system), a method (including a computer implemented method), an apparatus, a computer readable medium, a computer program product, a graphical user interface, a web portal, or a data structure tangibly fixed in a computer readable memory. Several embodiments of the present technology are discussed below. The appended drawings illustrate only typical embodiments of the present technology and therefore are not to be considered limiting of its scope and breadth.

FIG. 1 illustrates a system 100 configured to improve seismic imaging and estimation of attributes and/or rock properties of geobodies by exploiting self-consistency and/or differences between volume images and interpreted spatial/volumetric context, in accordance with one or more embodiments. More specifically, the system 100 may be configured to exploit positional and/or shape discrepancies and/or similarities of geobodies in image volumes associated with earth models of a geologic volume of interest to improve the accuracy of the earth models, velocity models used for prestack imaging, and/or the image volumes. In some embodiments, the system 100 may be configured to constrain a range of rock properties and confirm and/or specify dependencies between rock properties of geobodies associated with the geologic volume of interest. The system 100 may be configured to construct an earth model using multi-offset-multi-attribute image volumes and identified geobodies associated with a geologic volume of interest, according to some embodiments. Seismic data may be re-imaged with an updated model.

A geologic volume of interest may include one or more "overburdens." An overburden may generally be described as a geologic section above a bed, refractor, and/or reflector. Examples of an overburden may include material lying above an ore or valuable deposit and pressing down on it, loose unconsolidated material above bedrock, and/or other overburdens. An overburden may be associated with a velocity model and/or other model that can be used for re-imaging.

A geologic volume of interest may include one or more targets such as, for example, reservoir targets. Detailed analysis may be performed on such targets to determine information relating to geobodies and/or rock properties, in accordance with one or more embodiments. Depending on the specific information sought, a geologic volume of interest may include an entire geologic section from the surface to the target interval over an area of interest, or a geologic volume of interest may be confined to a specific target interval.

As depicted in FIG. 1, the system 100 may include electronic storage 102, a user interface 104, one or more information resources 106, at least one processor 108, and/or other components. In some embodiments, the electronic storage 102 comprises electronic storage media that electronically stores information. The electronic storage media of the electronic storage 102 may include system storage that is provided integrally (i.e., substantially non-removable) with the system 100 and/or removable storage that is removably connectable to the system 100 via, for example, a port (e.g., a USB port, a firewire port, etc.) or a drive (e.g., a disk drive, etc.). The electronic storage 102 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 102 may store software algorithms, information determined by the processor 108, information received via the user interface 104, information received from the information resources 106, and/or other information that enables the system 100 to function as described herein. The electronic storage 102 may be a separate component within the system 100, or the electronic storage 102 may be provided integrally with one or more other components of the system 100 (e.g., the processor 108).

The user interface 104 is configured to provide an interface between the system 100 and a user through which the user may provide information to and receive information from the system 100. This enables data, results, and/or instructions and any other communicable items, collectively referred to as "information," to be communicated between the user and the system 100. As used herein, the term "user" may refer to a single individual or a group of individuals who may be working in coordination. Examples of interface devices suitable for inclusion in the user interface 104 include one or more of a keypad, buttons, switches, a keyboard, knobs, levers, a display screen, a touch screen, speakers, a microphone, an indicator light, an audible alarm, and/or a printer. In one embodiment, the user interface 104 actually includes a plurality of separate interfaces.

It is to be understood that other communication techniques, either hard-wired or wireless, are also contemplated by the present technology as the user interface 104. For example, the present technology contemplates that the user interface 104 may be integrated with a removable storage interface provided by the electronic storage 102. In this example, information may be loaded into the system 100 from removable storage (e.g., a smart card, a flash drive, a removable disk, etc.) that enables the user to customize the implementation of the system 100. Other exemplary input devices and techniques adapted for use with the system 100 as the user interface 104 include, but are not limited to, an RS-232 port, RF link, an IR link, modem (telephone, cable or other). In short, any technique for communicating information with the system 100 is contemplated by the present technology as the user interface 104.

The information resources 106 include one or more sources of information related to the geologic volume of interest. By way of non-limiting example, one of information resources 106 may include seismic data acquired at or near the geological volume of interest, information derived therefrom, and/or information related to the acquisition. Such seismic data may include source wavefields and receiver wavefields. The seismic data may include individual traces of seismic data (e.g., the data recorded on one channel of seismic energy propagating through the geological volume of interest from a source), offset stacks, angle stacks, azimuth stacks, and/or other data. The information derived from the seismic data may include, for example, geologic models from seismic data representing energy that has propagated through the geologic volume of interest from one or more energy sources to one or more energy receivers, image volumes from the geologic model representing geobodies present in the geologic volume of interest, and/or other information. Individual ones of the image volumes may correspond to individual ones of the offset stacks, angle stacks, or azimuth stacks. Information related to the acquisition of seismic data may include, for example, data related to the position and/or orientation of a source of seismic energy, the positions and/or orientations of one or more detectors of seismic energy, the time at which energy was generated by the source and directed into the geological volume of interest, and/or other information.

The information resources 106 may include information other than seismic-related data associated with the geologic volume of interest. Examples of such information may include information relating to gravity, magnetic fields, resistivity, magnetotelluric information, radar data, well logs, rock properties, geological analog data, and/or other information.

The processor 108 is configured to provide information processing capabilities in the system 100. As such, the processor 108 may include one or more of a digital processor, an analog processor, a digital circuit designed to process information, an analog circuit designed to process information, a state machine, and/or other mechanisms for electronically processing information. Although the processor 108 is shown in FIG. 1 as a single entity, this is for illustrative purposes only. In some implementations, the processor 108 may include a plurality of processing units. These processing units may be physically located within the same device or computing platform, or the processor 108 may represent processing functionality of a plurality of devices operating in coordination.

As is shown in FIG. 1, the processor 108 may be configured to execute one or more computer program modules. The one or more computer program modules may include one or more of a communications module 110, a model module 112, an imaging module 114, a geobody interpretation module 116, a synthetic seismic data module 118, a property constraints module 120, and/or other modules. The processor 108 may be configured to execute modules 110, 112, 114, 116, 118, and/or 120 by software; hardware; firmware; some combination of software, hardware, and/or firmware; and/or other mechanisms for configuring processing capabilities on the processor 108.

It should be appreciated that although the modules 110, 112, 114, 116, 118, and 120 are illustrated in FIG. 1 as being co-located within a single processing unit, in implementations in which the processor 108 includes multiple processing units, one or more of the modules 110, 112, 114, 116, 118, and/or 120 may be located remotely from the other modules. The description of the functionality provided by the different modules 110, 112, 114, 116, 118, and/or 120 described below is for illustrative purposes, and is not intended to be limiting, as any of the modules 110, 112, 114, 116, 118, and/or 120 may provide more or less functionality than is described. For example, one or more of the modules 110, 112, 114, 116, 118, and/or 120 may be eliminated, and some or all of its functionality may be provided by other ones of the modules 110, 112, 114, 116, 118, and/or 120. As another example, the processor 108 may be configured to execute one or more additional modules that may perform some or all of the functionality attributed below to one of the modules 110, 112, 114, 116, 118, and/or 120. As yet another example, the processor 108 may be configured to execute one or more modules that may perform some or all of the functionality attributed to one or more modules described in co-pending U.S. patent application Ser. No. 13/017,995, filed Jan. 31, 2011, and entitled "Extracting Geologic Information from Multiple Offset Stacks and/or Angle Stacks," which is incorporated herein by reference.

The communications module 110 may be configured to receive information. Such information may be received from the information resources 106, the user via the user interface 104, the electronic storage 102, and/or other information sources. Examples of received information may include seismic data and information derived therefrom, information related to the acquisition of seismic data, offset stacks, angle stacks, azimuth stacks, geologic models, image volumes, and/or other information. Information received by the communications module 110 may be utilized by one or more of modules 112, 114, 116, 118, and/or 120. Examples of some such utilizations are described below. The communication module 110 may be configured to transmit information to one or more other components of the system 100.

The model module 112 may be configured to generate and/or otherwise obtain one or more models associated with a geologic volume of interest. The one or more models may be single- or multi-dimensional. Examples of such models may include an earth model, a velocity model, and/or other models associated with a geologic volume of interest. An earth model may include a numerical representation of at least one property (e.g., seismic velocity, density, attenuation, anisotropy, and/or other property) as a function of location within the geologic volume of interest. A velocity model may include a spatial distribution of velocity through which raypaths obeying Snell's law can be traced. A velocity model may refer to a model used in migration such as, for example, depth migration. A velocity model may be referred to as a velocity cube. In some implementations, the model module 112 may be configured to obtain a velocity model, an earth model, and/or other model from seismic data representing energy that has propagated through the geologic volume of interest from one or more energy sources to one or more energy receivers. The seismic data may include one or more offset stacks, one or more angle stacks, one or more azimuth stacks, and/or other seismic data.

The model module 112 may be configured to update an earth model, a velocity model, and/or other model using one or more inversion techniques. Performing an inversion may include deriving from data (e.g., seismic data, field data, and/or other data) a model to describe the subsurface of a geologic volume of interest that is consistent with the data. An inversion may include solving for a spatial distribution of parameters which could have produced an observed set of measurements. Examples of such parameters may include registration data, seismic event times, and/or other parameters.

The one or more inversion techniques may include one or more modeling realizations and/or comparisons to observed data. The one or more inversion techniques may include imaging with multiple models, holography, interferometry, and/or other inversion techniques. By was of non-limiting example, the one or more inversion techniques may include a time travel inversion. One type of time travel inversion may be a tomographic inversion. A tomographic inversion may include determining the subsurface velocity distribution using tomographic methods. Tomographic methods may include determining velocity and/or reflectivity distribution from a multitude of observations using combinations of source and receiver locations, and/or determining the resistivity distribution from conductivity measurements using a transmitter in one well and a receiver in another well.

The one or more inversion techniques may be based on registration data and/or assigned geobody types of geobodies included within the geologic volume of interest. Examples of geobody types may include one or more of a geological surface, a fluvial channel, a point bar, a reef, a fault, an unconformity, a delta, a dike, a sill, a salt body, a crevasse splay, a reservoir flow unit, a fluid contact, a turbidite channel, a turbidite sheet, and/or other geobody types.

The model module 112 may be configured to utilize one or more property constraints associated with geobodies to update an earth model, a velocity model, and/or other models. Property constraints are described in further detail in connection with the property constraints module 120. The model module 112 may be configured to generate and/or otherwise obtain an updated earth model, an updated velocity model, and/or other model, wherein one or more rock properties of geobodies represented in the updated earth model, the updated velocity model, and/or other model have been constrained based on assigned geobody types of identified geobodies represented in the updated earth model, the updated velocity model, and/or other model. Examples of rock properties may include one or more of velocity, anisotropy, density, acoustic properties, elastic properties, petrophysical properties, fluid properties, reservoir properties, geologic description, lithologic classification, and/or other rock properties.

The imaging module 114 may be configured to perform imaging, and/or generate and/or otherwise obtain one or more image volumes. Image volumes may correspond to individual ones of the offset stacks, angle stacks, azimuth stacks, and/or other information. Image volumes may represent geobodies present in a geologic volume of interest. An image volume may include a multi-offset-multi-attribute image volume.

In accordance with some embodiments, the imaging module 114 may be configured to generate and/or otherwise obtain a plurality of multi-offset-multi-attribute image volumes from seismic data. A given one of the multi-offset-multi-attribute image volumes may correspond to one of the offset stacks, angle stacks, and/or azimuth stacks. A given one of the multi-offset-multi-attribute image volumes may be associated with at least one attribute. Examples of attributes may include one or more of coherence, Hilbert transform, amplitude, instantaneous frequency, spectral decomposition, attenuation, impedance, Poisson's ratio, offset dependency of seismic response, reflection angle and/or azimuth dependency of seismic response, dip, magnitude, curvature, roughness, dip azimuth, spectral shape, and/or other attributes. A given one of the multi-offset-multi-attribute image volumes may include geobody representations of geobodies present in the geologic volume of interest. The imaging module 114 may be configured to generate and/or otherwise obtain one or more updated multi-offset-multi-attribute image volumes based on the updated earth model and/or the updated velocity model.

According to some embodiments, the imaging module 114 may be configured to generate and/or otherwise obtain a plurality of multi-offset-multi-attribute image volumes from synthetic seismic data. Synthetic seismic data is described further in connection with the synthetic seismic data module 118. A given one of the multi-offset-multi-attribute image volumes may correspond to one of an offset stack, an angle stack, or an azimuth stack of the synthetic seismic data. A given one of the multi-offset-multi-attribute image volumes may be is associated with a seismic attribute. A given one of the multi-offset-multi-attribute image volumes may include geobody representations of geobodies previously unidentified in the updated earth model and/or velocity model.

The geobody interpretation module 116 may be configured to determine, identify, and/or receive geobody interpretations. In some embodiments, the geobody interpretations may be received via the user interface 104. Geobody interpretations may be based on one or more image volumes, which may include one or more multi-offset-multi-attribute image volumes. The geobody interpretations may include identified geobodies having geobody representations in the image volumes. The geobody interpretations may include geobody types assigned to the identified geobodies.

The geobody interpretation module 116 may be configured to obtain registration data associated with individual identified geobodies in different ones of the image volumes based on the assigned geobody types. The registration data for a given geobody may represent a spatial position, a shape of the given geobody, discrepancies and/or similarities between geobody representations of the given geobody in different ones of the image volumes, and/or other information associated with the given geobody.

The geobody interpretation module 116 may be configured to verify identified geobodies based on a comparison between synthetic seismic data and the seismic data used to obtain the image volumes. Synthetic seismic data is described in further detail in connection with the synthetic seismic data module 118. The geobody interpretation module 116 may be configured to determine and/or receive a reinterpretation of a first geobody responsive to the verifying of the identified geobodies indicating an interpretation of the first geobody is inaccurate. The reinterpretation of the first geobody may include a new assignment of geobody type for the first geobody. The geobody interpretation module 116 may be configured to obtain new registration data for the first geobody corresponding to the reinterpretation.

The geobody interpretation module 116 may be configured to determine and/or receive rock properties and/or geobody types assigned to the identified geobodies. The rock properties and/or geobody types may be assigned consistent with geologic principles, stratigraphic principles, and/or an analog database. As mentioned above, rock properties may include, for example, one or more of velocity, anisotropy, density, acoustic properties, elastic properties, petrophysical properties, fluid properties, reservoir properties, geologic description, lithologic classification, and/or other rock properties.

The geobody interpretation module 116 may be configured to perform constrained seismic inversions. A constrained inversion may refer to a limitation on the output values of rock properties through the inversion process, an inversion over a limited seismic frequency bandwidth, and/or other constrained inversions. The geobody interpretation module 116 may be configured to perform a constrained seismic inversion to determine rock properties of the identified geobodies. The geobody interpretation module 116 may be configured to perform a constrained seismic inversion to identify other geobodies with associated rock properties in order to reduce differences between observed seismic data and synthetic data. According to some embodiments, a constrained seismic inversion may be stabilized by the constrained rock properties of the identified geobodies.

The synthetic seismic data module 118 may be configured to generate and/or otherwise obtain synthetic seismic data. The synthetic seismic data may correspond to an earth model, a velocity model, and/or other model. Synthetic seismic data may include an artificial seismic reflection record generated by assuming that a particular waveform travels through an assumed model. Synthetic seismic data may not be restricted by dimensionality of a corresponding model. Synthetic seismic data may not be limited by the complexity of mathematics and/or incorporated physical properties used to describe the corresponding model and/or represent the wave propagation. Synthetic seismic data may include propagation through a single- or multi-dimensional elastic model with attenuation and velocity anisotropy.

The property constraints module 120 may be configured to determine and/or otherwise obtain one or more property constraints for one or more rock properties of the geobodies in an earth model, a velocity model, and/or other model associated with the geologic volume of interest. The property constraints module 120 may be configured to determine and/or otherwise obtain the one or more property constraints by constraining a range of rock properties associated with individual ones of the geobodies based on geologic principles, stratigraphic principles, and/or an analog database. The property constraints module 120 may be configured to verify the property constraints based on one or more of dependencies between the one or more rock properties, well data logs, data derived from well data logs, local geological knowledge of the geological volume of interest, and/or other information.

Figure 2:
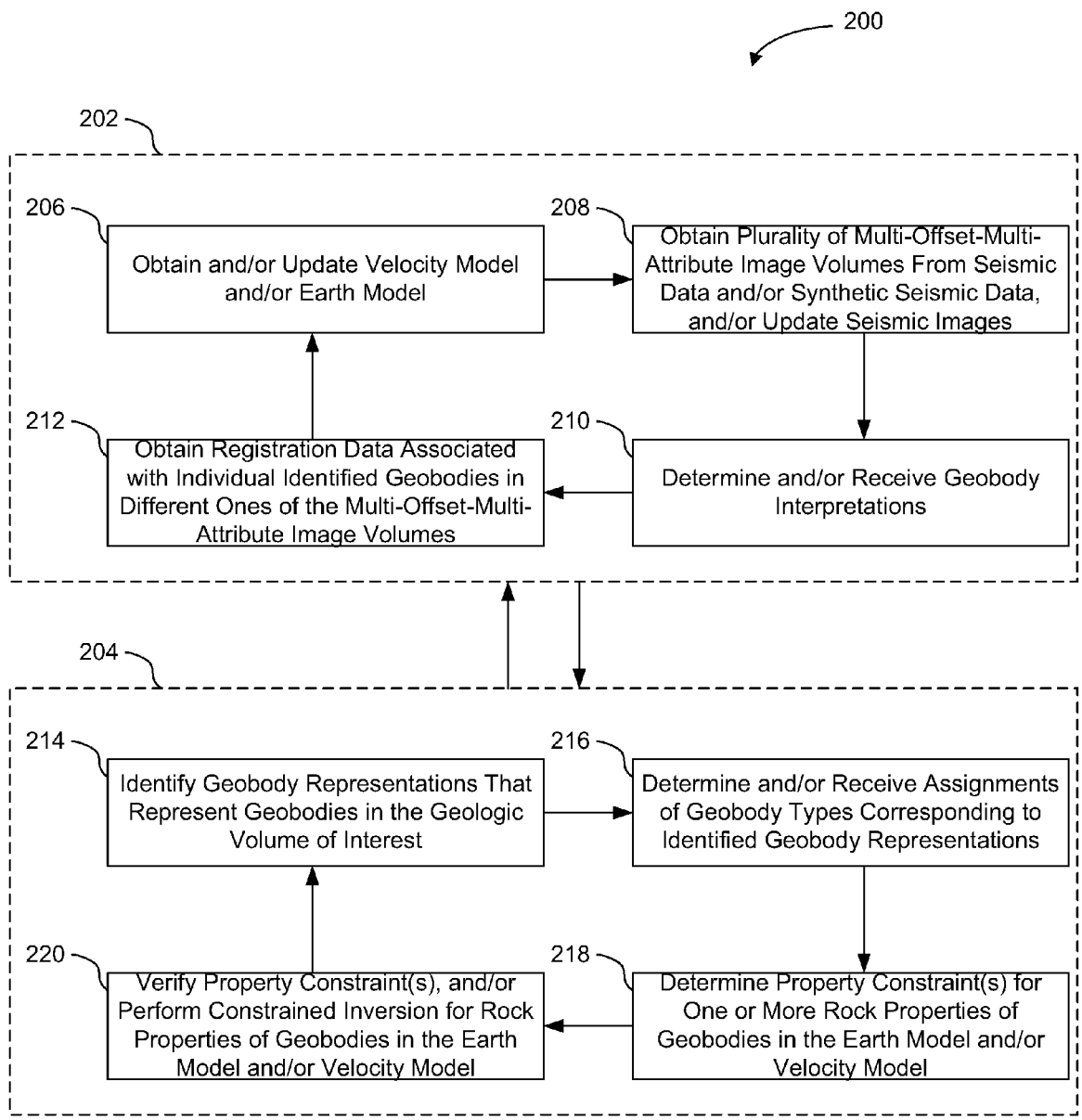
FIG. 2 illustrates a method for improving seismic imaging and estimation of attributes and/or rock properties of geobodies by exploiting self-consistency and/or differences between volume images and interpreted spatial/volumetric context, in accordance with one or more embodiments.

FIG. 2 illustrates a method 200 for improving seismic imaging and estimation of attributes and/or rock properties of geobodies by exploiting self-consistency and/or differences between volume images and interpreted spatial/volumetric context, in accordance with one or more embodiments. The operations of the method 200 presented below are intended to be illustrative. In some embodiments, the method 200 may be accomplished with one or more additional operations not described, and/or without one or more of the operations discussed. For example, the method 200 may include one or more operations described in co-pending U.S. patent application Ser. No. 13/017,995, filed Jan. 31, 2011, and entitled "Extracting Geologic Information from Multiple Offset Stacks and/or Angle Stacks," which has been incorporated herein by reference. Additionally, the order in which the operations of the method 200 are illustrated in FIG. 2 and described below is not intended to be limiting.

In some embodiments, the method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the method 200 in response to instructions stored electronically on an electronic storage medium. The one or more processing devices may include one or more devices configured through hardware, firmware, and/or software to be specifically designed for execution of one or more of the operations of the method 200.

As depicted in FIG. 2, the method 200 may include a loop 202, a loop 204, and/or other loops. Operations included in the loop 202 and the loop 204 may be performed separately or in conjunction with each other. Information may be passed between the loop 202 and the loop 204 to compliment one or more operations included therein.

The loop 202 may relate to imaging and/or modeling improvement. More specifically, the loop 202 may relate to exploiting positional and/or shape discrepancies and/or similarities of geobodies in image volumes associated with earth models of a geologic volume of interest to improve the accuracy of the earth models, velocity models used for pre-stack imaging, and/or the image volumes. The loop 202, may relate to constructing an earth model using multi-offset-multi-attribute image volumes and identified geobodies associated with a geologic volume of interest. Seismic data may be re-imaged with an updated model. One or more operations in the loop 202 may be iteratively repeated such that magnitudes of the discrepancies are decreased and/or to make other imaging and/or modeling refinements.

At operation 206, a velocity model and/or an earth model may be obtained and/or updated. A velocity model and/or an earth model may be obtained from seismic data representing energy that has propagated through the geologic volume of interest from one or more energy sources to one or more energy receivers. The seismic data may include one or more of a plurality of offset stacks, a plurality of angle stacks, or a plurality of azimuth stacks. The earth model and/or the velocity model may be updated using travel time inversion techniques based on registration data and assigned geobody types associated with geobodies within the geologic volume of interest. One or more rock properties of geobodies represented in the updated earth model and/or velocity model may have been constrained based on assigned geobody types of identified geobodies represented in the updated earth model and/or velocity model. Synthetic seismic data corresponding to the updated earth model and/or velocity model may be obtained at operation 206. The model module 112 and/or the synthetic seismic data module 118 may perform some or all of operation 206, in accordance with some embodiments.

At operation 208, a plurality of multi-offset-multi-attribute image volumes may be obtained from seismic data and/or synthetic seismic data. Where the plurality of multi-offset-multi-attribute image volumes are obtained from seismic data, a given one of the multi-offset-multi-attribute image volumes (1) may correspond to one of the offset stacks, angle stacks, or azimuth stacks, (2) may be associated with at least one attribute, and/or (3) may include geobody representations of geobodies present in the geologic volume of interest. Where the plurality of multi-offset-multi-attribute image volumes are obtained from synthetic seismic data a given one of the multi-offset-multi-attribute image volumes (1) may correspond to one of an offset stack, an angle stack, or an azimuth stack of the synthetic seismic data, (2) may be associated with a seismic attribute, and (3) may include geobody representations of geobodies previously unidentified in the updated earth model and/or velocity model. Updated multi-offset-multi-attribute image volumes may be generated at operation 208 based on the updated earth model and/or the updated velocity model (see operation 206). This may include implementing one or more changes in image processing parameterization. The imaging module 114 may perform operation 208, in accordance with some embodiments.

At operation 210, geobody interpretations are determined and/or received. The geobody interpretations may be based on the multi-offset-multi-attribute image volumes. The geobody interpretations may include identified geobodies having geobody representations in the multi-offset-multi-attribute image volumes and geobody types assigned to the identified geobodies. A constrained seismic inversion may be performed at operation 210 to determine rock properties of the identified geobodies, and/or to identify other geobodies with associated rock properties in order to reduce differences between observed seismic data and the synthetic data. The constrained seismic inversion may be stabilized by the constrained rock properties of the identified geobodies. The geobody interpretation module 116 may perform operation 210, in accordance with some embodiments.

At operation 212, registration data associated with individual identified geobodies in different ones of the multi-offset-multi-attribute image volumes is obtained. The registration data may be obtained based on the assigned geobody types. The registration data for a given geobody may representing a spatial position, a shape of the given geobody, and/or discrepancies and/or similarities between geobody representations of the given geobody in different ones of the multi-offset-multi-attribute image volumes. The geobody interpretation module 116 may perform operation 212, in accordance with some embodiments.

The loop 204 may relate to interpretation of rock properties within the geobodies. More specifically, the loop 204 may relate to constraining a range of rock properties and confirming and/or specifying dependencies between rock properties of geobodies associated with a geologic volume of interest. In exemplary embodiments, loop 204 may provide constrained inversion results for the rock properties of some or all of the geobodies in the geological volume of interest. One or more operations in the loop 204 may be iteratively repeated to eliminate and/or refine one or more property constraints, and/or to make other interpretive refinements.

At operation 214, geobody representations that represent geobodies in the geologic volume of interest are identified. The geobody representations may be interpreted from individual ones of the multi-offset-multi-attribute image volumes. The geobody interpretation module 116 may perform operation 214, in accordance with some embodiments.

At operation 216, assignments of geobody types corresponding to the identified geobody representations are determined and/or received. The geobody types may be determined and/or received based on geologic principles, stratigraphic principles, and/or an analog database. The geobody interpretation module 116 may perform operation 216 in accordance with some embodiments.

At operation 218, one or more property constraints for one or more rock properties of the geobodies in the earth model and/or velocity model may be constrained by a range of rock properties associated with individual ones of the geobodies based on geologic principles, stratigraphic principles, and/or an analog database. One or more property constraints for one or more rock properties of the geobodies in the earth model and/or velocity model may be estimated from well data logs, data derived from well data logs, and/or local geological knowledge of the geological volume of interest. In exemplary embodiments, such estimates may be based on extrapolation from local well measurements. The property constraints module 120 may perform operation 218, in accordance with some embodiments.

At operation 220, the one or more property constraints are verified. Using at least one of the verified one or more property constraints, a constrained seismic inversion may be performed (see, e.g., operation 210) to determine rock properties of all the identified geobodies, and/or to identify all other geobodies with associated rock properties in the geological volume of interest in order to reduce differences between observed seismic data and the synthetic data. The constrained seismic inversion may be stabilized by the constrained rock properties of the identified geobodies. The property constraints module 120 may perform operation 220, in accordance with some embodiments.

Although the technology has been described in detail for the purpose of illustration based on what is currently considered to be the most practical and preferred embodiments, it is to be understood that such detail is solely for that purpose and that the technology is not limited to the disclosed embodiments, but, on the contrary, is intended to cover modifications and equivalent arrangements that are within the spirit and scope of the appended claims. For example, it is to be understood that the present technology contemplates that, to the extent possible, one or more features of any embodiment can be combined with one or more features of any other embodiment.

What is claimed is:

1. A computer-implemented method for constraining a range of rock properties and confirming and/or specifying dependencies between rock properties of geobodies associated with a geologic volume of interest, the method comprising:

identifying geobody representations that represent geobodies in the geologic volume of interest, the geobody representations being interpreted from individual ones of a plurality of multi-offset-multi-attribute image volumes, wherein a given one of the multi-offset-multi-attribute image volumes (1) corresponds to one of the offset stacks, angle stacks, or azimuth stacks, (2) is associated with one of the attributes, and (3) includes geobody representations of geobodies present in the geologic volume of interest;

receiving assignments of geobody types corresponding to the identified geobody representations based on one or more geologic principles, one or more stratigraphic principles, and/or an analog database;

determining one or more property constraints for one or more rock properties of the geobodies in an earth model and/or a velocity model associated with the geologic volume of interest by constraining a range of rock properties associated with individual ones of the geobodies based on the one or more geologic principles, the one or more stratigraphic principles, and/or geological analog database; and verifying the one or more property constraints based on one or more of dependencies between the one or more rock properties, one or more well data logs, or data derived from the well data logs, of the geological volume of interest.

2. The method of claim 1, further comprising iteratively repeating (1) the identifying of geobody representations, (2) the receiving of assignments of geobody types corresponding to the identified geobody representations, (3) the determining of one or more property constraints, and (4) the verifying of the property constraints.

3. The method of claim 1, further comprising utilizing the one or more property constraints associated with the geobodies to update the earth model and/or the velocity model.

4. The method of claim 1, wherein the assigned geobody types comprise one or more of a geological surface, a fluvial channel, a point bar, a reef, a fault, an unconformity, a delta, a dike, a sill, a salt body, a crevasse splay, a reservoir flow unit, a fluid contact, a turbidite channel, or a turbidite sheet.

5. The method of claim 1, wherein the attributes comprise one or more of coherence, Hilbert transform, amplitude, instantaneous frequency, spectral decomposition, attenuation, impedance, Poisson's ratio, offset dependency of seismic response, reflection angle and/or azimuth dependency of seismic response, dip, magnitude, curvature, roughness, dip azimuth, or spectral shape.

6. The method of claim 1, wherein the rock properties comprise one or more of velocity, anisotropy, density, one or more acoustic properties, one or more elastic properties, one or more petrophysical properties, one or more fluid properties, one or more reservoir properties, a geologic description, or a lithologic classification.

7. A system configured to constrain a range of rock properties and confirming and/or specifying dependencies between rock properties of geobodies associated with a geologic volume of interest, the system comprising:

one or more processors configured to execute computer program modules, the computer program modules comprising:

a geobody interpretation module configured to identify geobody representations that represent geobodies in the geologic volume of interest, the geobody representations being interpreted from individual ones of a plurality of multi-offset-multi-attribute image volumes, wherein a given one of the multi-offset-multi-attribute image volumes (1) corresponds to one of the offset stacks, angle stacks, or azimuth stacks, (2) is associated with one of the attributes, and (3) includes geobody representations of geobodies present in the geologic volume of interest;

the geobody interpretation module being further configured to receive assignments of geobody types corresponding to the identified geobody representations based on one or more geologic principles, one or more stratigraphic principles, and/or a geological analog database;

a property constraints module configured to determine one or more property constraints for one or more rock properties of the geobodies in an earth model and/or a velocity model associated with the geologic volume of interest by constraining a range of rock properties associated with individual ones of the geobodies based on the one or more geologic principles, the one or more stratigraphic principles, and/or an analog database; and the property constraints module being further configured to verify the one or more property constraints based on one or more of dependencies between the one or more rock properties, well data logs, or data derived from well data logs, of the geological volume of interest.

8. The system of claim 7, wherein the geobody interpretation module and/or the property constraints module are further configured to iteratively repeat (1) the identifying of geobody representations, (2) the receiving of assignments of geobody types corresponding to the identified geobody representations, (3) the determining of one or more property constraints, and (4) the verifying of the property constraints.

9. The system of claim 7, further comprising a model module configured to utilize the one or more property constraints associated with the geobodies to update the earth model and/or the velocity model.

10. The system of claim 7, wherein the assigned geobody types comprise one or more of a geological surface, a fluvial channel, a point bar, a reef, a fault, an unconformity, a delta, a dike, a sill, a salt body, a crevasse splay, a reservoir flow unit, a fluid contact, a turbidite channel, or a turbidite sheet.

11. The system of claim 7, wherein the attributes comprise one or more of coherence, Hilbert transform, amplitude, instantaneous frequency, spectral decomposition, attenuation, impedance, Poisson's ratio, offset dependency of seismic response, reflection angle and/or azimuth dependency of seismic response, dip, magnitude, curvature, roughness, dip azimuth, or spectral shape.

12. The system of claim 7, wherein the rock properties comprise one or more of velocity, anisotropy, density, one or more acoustic properties, one or more elastic properties, one or more petrophysical properties, one or more fluid properties, one or more reservoir properties, a geologic description, or a lithologic classification.

13. A non-transitory, computer-readable storage medium having instructions embodied thereon, the instructions being executable by a processor to perform a method for constraining a range of rock properties and confirming and/or specifying dependencies between rock properties of geobodies associated with a geologic volume of interest, the method comprising:

identifying geobody representations that represent geobodies in the geologic volume of interest, the geobody representations being interpreted from individual ones of a plurality of multi-offset-multi-attribute image volumes, wherein a given one of the multi-offset-multi-attribute image volumes (1) corresponds to one of the offset stacks, angle stacks, or azimuth stacks, (2) is associated with one of the attributes, and (3) includes geobody representations of geobodies present in the geologic volume of interest;

receiving assignments of geobody types corresponding to the identified geobody representations based on one or more geologic principles, one or more stratigraphic principles, and/or geological analog database;

determining one or more property constraints for one or more rock properties of the geobodies in an earth model and/or a velocity model associated with the geologic volume of interest by constraining a range of rock properties associated with individual ones of the geobodies based on the one or more geologic principles, the one or more stratigraphic principles, and/or an analog database; and verifying the one or more property constraints based on one or more of dependencies between the one or more rock properties, one or more well data logs, or data derived from the well data logs, of the geological volume of interest.

14. The non-transitory, computer-readable storage medium of claim 13, wherein the method further comprises iteratively repeating (1) the identifying of geobody representations, (2) the receiving of assignments of geobody types corresponding to the identified geobody representations, (3) the determining of one or more property constraints, and (4) the verifying of the property constraints.

15. The non-transitory, computer-readable storage medium of claim 13, wherein the method further comprises utilizing the one or more property constraints associated with the geobodies to update the earth model and/or the velocity model.

16. The non-transitory, computer-readable storage medium of claim 13, wherein the assigned geobody types comprise one or more of a geological surface, a fluvial channel, a point bar, a reef, a fault, an unconformity, a delta, a dike, a sill, a salt body, a crevasse splay, a reservoir flow unit, a fluid contact, a turbidite channel, or a turbidite sheet.

17. The non-transitory, computer-readable storage medium of claim 13, wherein the attributes comprise one or more of coherence, Hilbert transform, amplitude, instantaneous frequency, spectral decomposition, attenuation, impedance, Poisson's ratio, offset dependency of seismic response, reflection angle and/or azimuth dependency of seismic response, dip, magnitude, curvature, roughness, dip azimuth, or spectral shape.

18. The non-transitory, computer-readable storage medium of claim 13, wherein the rock properties comprise one or more of velocity, anisotropy, density, one or more acoustic properties, one or more elastic properties, one or more petrophysical properties, one or more fluid properties, one or more reservoir properties, a geologic description, or a lithologic classification.

* * * * *